April 29, 1924.
A. W. SKINNER
1,491,828
DAY CALCULATOR
Filed Dec. 29, 1922
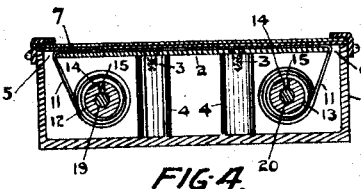
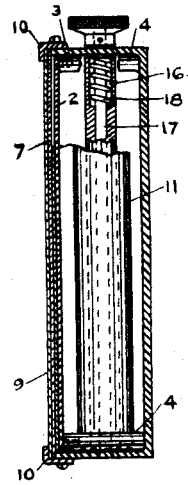
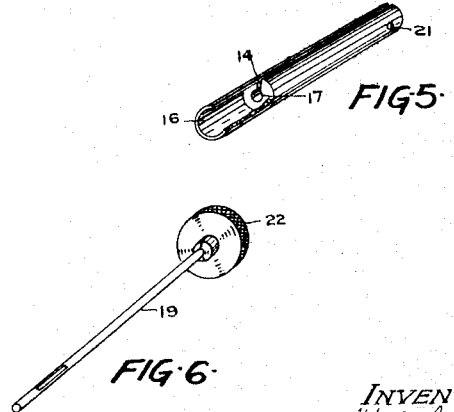
INVENTOR
Adolph Wesley Skinner
BY E.J. Featherstonhaugh
ATTORNEY Patented Apr. 29, 1924.

1,491,828

UNITED STATES PATENT OFFICE.

ADOLPH W. SKINNER, OF MONTREAL, QUEBEC, CANADA.

DAY CALCULATOR.

Application filed December 29, 1922. Serial No. 609,613.

*To all whom it may concern:*

Be it known that I, ADOLPH WESLEY SKINNER, a citizen of the United States of America, and residing at Montreal, in the Province of Quebec, in the Dominion of Canada, have invented a new and useful Day Calculator, of which the following is the specification.

The invention relates to a day calculator as described in the present specification and shown in the accompanying drawings that form part of the same.

The invention consists essentially of the novel features pointed out broadly and specifically in the claims for novelty following a description containing an explanation in detail of an acceptable form of the invention.

The objects of the invention are to furnish to bankers and others interested in the ready calculation of periods in days a calendar with a change sheet that will enable the user to see at a glance the exact number of days from one date to another specifically in banking from the day a note is discounted to the day of maturity, so that the interest may be determined by reference to an accompanying table as customary in the business of money lending; to eliminate the errors due to careless calculations; to economize in time and labor in business and other institutions and wherever this device may be applicable; and generally to provide a ready reckoner, simple as to its parts and not liable to get out of order and efficient in operation.

In the drawings, Figure 1 is a plan view of the device showing the exposed face, the calendar and the change sheet therebelow.

Figure 2 is a fragmentary detail of the change sheet.

Figure 3 is a longitudinal and sectional view through the casing.

Figure 4 is a cross sectional view on the line 4—4 in Figure 1.

Figure 5 is a perspective detail of a reel core.

Figure 6 is a perspective detail of an operating rod and knurled knob.

Like numerals of reference indicate corresponding parts in the various figures.

Referring to the drawings, the casing 1 is preferably made in the shape of a rectangular box having a lid or plate 2 fitting thereinto and secured by the screws 3 to the bosses 4, and having narrow slits or openings 5 and 6 between itself and each longitudinal wall. The walls of the box 1 project slightly above the plate 2 and on this plate the calendar 7 is laid.

The calendar 7 is made of card board or any other suitable sheet material and is formed with eighteen vertical slots 8 or as many as may be found desirable, though here shown as eighteen, so as to clearly explain the invention.

To the left of the slots 8 the days of the months are enumerated, and above and below these figures the names of the calendar months are shown from January to December and from January to June.

The calendar 7 is covered by a transparent sheet of celluloid 9 or by glass or other transparent material and this is held in place by the flanged rims 10 screwed to the casing walls or otherwise secured.

It is obvious that this construction may be considerably modified and that it is only for greater clearness that the details are shown and described.

The change sheet 11 passes under the calendar 7 and over the plate 2 and through the slits 5 and 6.

The change sheet 11 contains a plurality of columns of figures running consecutively from 1 to 32, 1 to 63, 1 to 91, 1 to 122, 1 to 152, 1 to 183, 1 to 184, 1 to 184, 1 to 187, 1 to 186, 1 to 187, 1 to 186, 1 to 187, 32 to 187, 60 to 184, 91 to 185, 121 to 184 and 152 to 185.

The numeral 1 is set forward one calendar month in each column reading from the bottom, according to the number of days in the respective months of the year, and this means that by reading across the calendar from the day of discounting a bill to the day of maturity, the exact number of days of the term will appear to the right of the day of maturity.

The change sheet 11 is preferably made of linen, or it may be of paper or any flexible material, and it is reeled on the cores 12 and 13 each of said cores being hollow and having the longitudinal split 14 into which the sheet is pinched adjacent to the ends and held by the wedge strips 15. The cores 12 and 13 are each formed at one end with a spring recess 16 slightly larger than the bore 17 and into which the springs 18 are introduced.

The rods 19 and 20 are inserted through the cores 12 and 13 and held by the set screws 21 and at one end the knurled knobs 22 and 23 are mounted and by means of these knobs the change sheet 11 is wound on the cores 12 and 13 until it is stretched tightly across the plate 2 under the calendar 7 and over the plate 2, the springs 18 holding the cores to keep the sheet tight.

In the use of this invention the change sheet is set by turning one or other of the knobs until the beginning of a column comes to the day from which the calculation is to be made, and by looking to the right of any date thereafter, which may happen to be the date of maturity, the change sheet will disclose through the vertical slot the number of days on which interest is to be calculated.

In the form of the invention illustrated provision has been made for days of grace in the matter of bills of exchange, but this will not be required in some States and thereafter modification may be made to suit surrounding conditions of use.

It is also desirable for the banking business to have Sundays and holidays printed in a contrasting color on the calendar, thus necessitating the change of the calendar yearly, otherwise it is perpetual, but it is an extremely simple matter to change and adds no material expense in the production of the device, though for such changes it may be advisable to alter the construction to facilitate the replacement of the calendar from one year to the other.

What I claim is:—

1. In a day calculator, a calendar showing the months in consecutive order for a predetermined period and the days of each month in adjacent rows and a change sheet having adjacent rows of figures starting from the unit one in each row and taking in the full period permitted by the calendar and adapted to appear beside the rows of calendar days respectively and to be adjusted to read from any particular day on said calendar.

2. In a day calculator, a calendar for a chosen period having the days of each month set forth in rows on a sheet and slots through the sheet, and a change sheet having adjacent rows of figures starting from the unit one in each row and taking in the full period permitted by the calendar and adapted to appear beside the rows of calendar days respectively and to be adjusted to read from any particular day on said calendar.

3. In a day calculator, a calendar for a chosen period having a plurality of vertical slots in a sheet and the days of each month in vertical rows beside the slots respectively, and a change sheet having adjacent rows of figures starting from the unit one in each row and taking in the full period permitted by the calendar and adapted to appear beside the rows of calendar days respectively, and to be adjusted to read from any particular day on said calendar.

4. In a day calculator, a sheet calendar having the months set forth in a row thereacross for a predetermined period, and the days in vertical rows to the left of said slots, and a change sheet having adjacent rows of figures starting from the unit one in each row and taking in the full period permitted by the calendar and adapted to appear beside the rows of calendar days respectively, and to be adjusted to read from any particular day on said calendar.

Signed at Montreal, Canada, this 22d day of December, 1922.

A. W. SKINNER.